United States Patent
Krug et al.

Patent Number: 6,056,091
Date of Patent: May 2, 2000

[54] BRAKE SHOE FOR A SPOT-TYPE DISC BRAKE

[75] Inventors: Holger Krug, Bad Homburg; Peter Schrader, Rosbach; Gunther Leopold, Frankfurt, all of Germany

[73] Assignee: ITT Manufacturing Enterprises Inc., Wilmington, Del.

[21] Appl. No.: 09/101,414

[22] PCT Filed: Dec. 13, 1996

[86] PCT No.: PCT/EP96/05594

§ 371 Date: Oct. 5, 1998

§ 102(e) Date: Oct. 5, 1998

[87] PCT Pub. No.: WO97/26463

PCT Pub. Date: Jul. 24, 1997

[30] Foreign Application Priority Data

Jan. 20, 1996 [DE] Germany .......................... 196 02 037

[51] Int. Cl.[7] ................................................... F16D 65/38
[52] U.S. Cl. .................................. 188/73.37; 188/250 B; 188/250 G
[58] Field of Search ........................... 188/250 B, 250 G, 188/250 R, 73.1, 250 E, 73.35–73.37

[56] References Cited

U.S. PATENT DOCUMENTS

| | | |
|---|---|---|
| 3,616,878 | 11/1971 | Girauldon . |
| 5,842,546 | 12/1998 | Biswas ................................. 188/73.37 |

FOREIGN PATENT DOCUMENTS

| | | |
|---|---|---|
| 2570150 | 3/1986 | France . |
| 2305701 | 8/1973 | Germany . |
| 2718483 | 11/1978 | Germany . |
| 3402866 | 9/1984 | Germany . |
| 3906450 | 9/1990 | Germany . |
| 4004607 | 8/1991 | Germany . |
| 2087996 | 6/1982 | United Kingdom . |
| 2127918 | 4/1984 | United Kingdom . |
| 92/13210 | 8/1992 | WIPO . |
| 97/26463 | 7/1997 | WIPO . |

*Primary Examiner*—Chris Schwartz
*Attorney, Agent, or Firm*—Rader, Fishman & Grauer PLLC

[57] ABSTRACT

The present invention relates to a brake shoe for a spot-type disc brake, in particular floating-caliper brake, which includes a lining carrier plate that has on its front side a brake lining intended for application to a brake disc and, in addition, is provided with a noise-damping means. To further improve noise damping, the lining carrier plate has a noise-damping radial layer made of an appropriate material on its radial contact points towards the brake carrier and/or the brake housing. Further, the noise-damping layer is provided by a deflected portion of the damping plate.

4 Claims, 2 Drawing Sheets

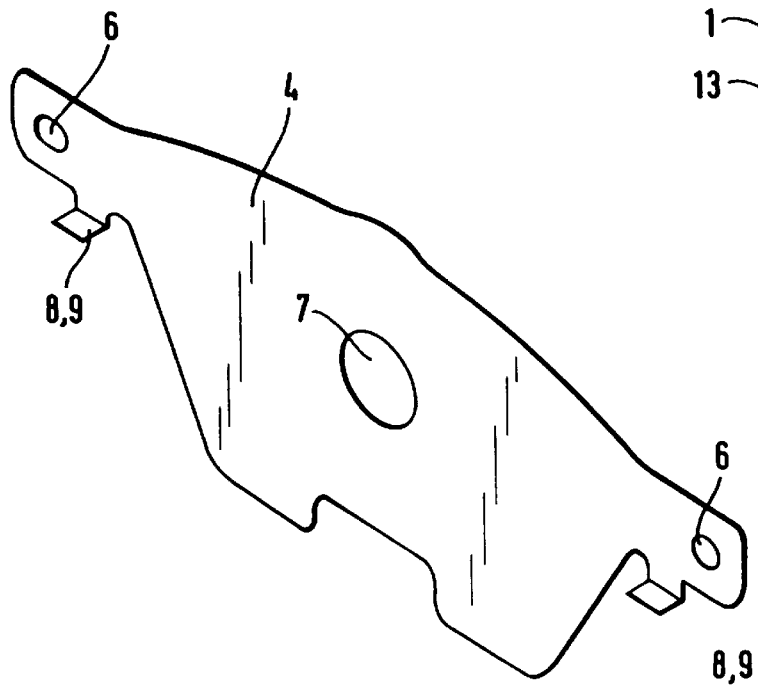
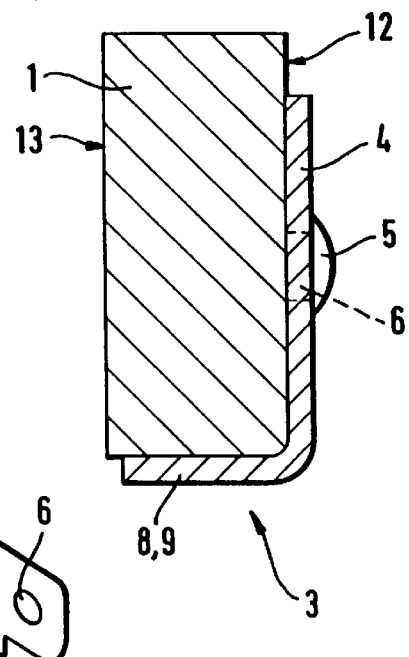
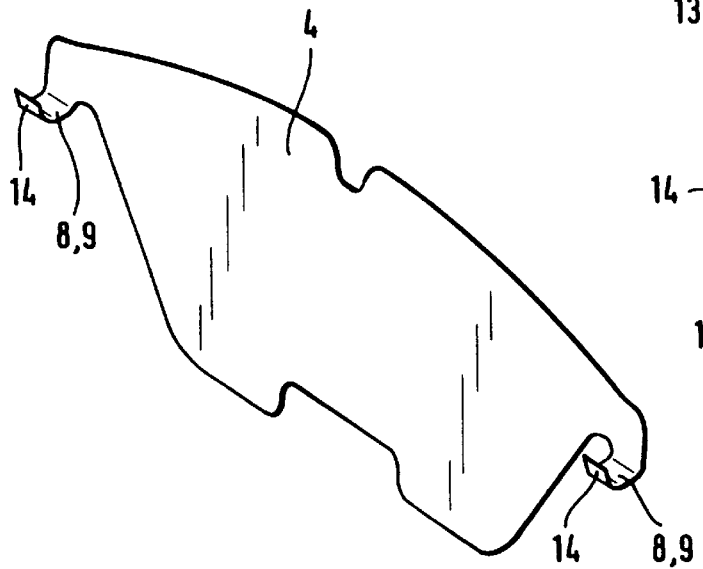
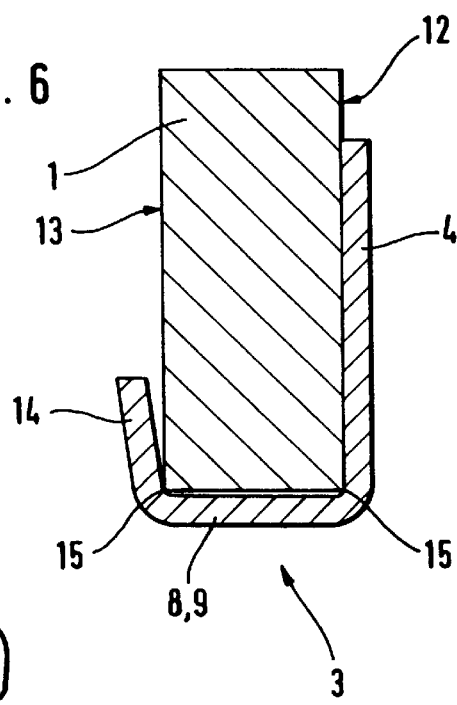

BRAKE SHOE FOR A SPOT-TYPE DISC BRAKE

TECHNICAL FIELD

The present invention relates to a brake shoe and more particularly relates to a brake shoe for a spot-type disc brake.

BACKGROUND OF THE INVENTION

German patent application No. 23 05 701 discloses a disc brake having brake shoes provided with a noise-damping means. The noise-damping means is made up of a damping element with plastic and elastic properties which is heat resistant, and a cover element in the shape of a metal sheet. The noise-damping means is attached to either the back side of the lining carrier plate or said's tangential frontal end, preferably, by cementing.

Another brake shoe for disc brakes with a noise-damping means is disclosed in WO 92/13210. In this case, the noise-damping means is provided by a damping plate which is attached to the back side of the lining carrier plate.

It has been found that the noise damping provisions known from the above mentioned publications will not achieve a satisfactory result for a brake shoe of a disc brake.

An object of the present invention is to further develop a brake shoe for a spot-type disc brake, in particular for a floating-caliper brake, so that noise damping is improved.

Prior art solutions have not adequately considered the fact that a major part of vibrations which develop noise are produced in a radial direction in a spot-type disc brake, in particular a floating-caliper brake. Therefore, the objective of the basic idea of the present invention is to avoid noise-producing vibrations between the brake shoe or its lining carrier plate, on the one hand, and the brake carrier and/or the brake housing, on the other hand, or to reduce such vibrations to an extent which is insignificant in terms of the development of disturbing noises.

According to the present invention, the lining carrier plate of the brake shoe has a noise-damping layer on its radial contact surfaces towards the brake carrier and/or the brake housing.

In a preferred embodiment of the present invention relating to a brake shoe having a lining carrier plate which carries on its back side a damping plate that is appropriate to damp noise-producing vibrations in the axial or tangential direction, the noise-damping radial layer is a portion of the damping plate which is already provided. The portion is arranged on the corresponding radial contact surface of the lining carrier plate. In a most simple way, a tab-shaped extension which projects from a corresponding edge of the damping plate is bent off in an axial direction of the brake so that this portion of the damping plate abuts directly on the respective radial contact surface of the lining carrier plate.

In a preferred embodiment, the damping plate is attached on the back side of the lining carrier plate by axially projecting pins which extend through corresponding bores in the damping plate and are then riveted, preferably, wobble riveted. This provides a safe attachment of the damping plate on the lining carrier plate which additionally promotes the damping or the suppression of noise-producing vibrations.

For an optimal configuration of the brake shoe, it is recommended that, the portion or portions providing the noise-damping radial layer for the lining carrier plate include(s) an extension which is at least almost at right angles thereto and backgrips the front side of the lining carrier plate. This provision improves the reliability in attachment of the damping plate to the lining carrier plate. In addition, slidability of the lining carrier plate on the brake carrier is improved because the frontal end of the radial layer has no sharp edge which might get hooked on the sliding surface of the brake carrier. Further, the length of the layer in relation to the bent-off extension may be configured and dimensioned so that the respective portion of the damping plate, which is intended for noise damping, is fixed with a certain preload on the lining carrier plate. This prevents the portion of the damping plate from freely swinging outwards and transmitting noise-producing vibrations onto the contact points. The contact points mainly have an only point-shaped or line-shaped design and, thus, are extremely small.

BRIEF DESCRIPTION OF THE DRAWINGS

FIG. 3 is an embodiment of a damping plate.

FIG. 4 is an enlarged view of a cross-section taken along line A—A in FIG. 1, where a damping plate according to FIG. 3 is used.

FIG. 5 is a second embodiment of a damping plate.

FIG. 6 is an enlarged view of a cross-section taken along line A—A in FIG. 1, where a damping plate according to FIG. 5 is used.

DETAILED DESCRIPTION OF THE PREFERRED EMBODIMENTS

Figure 1:
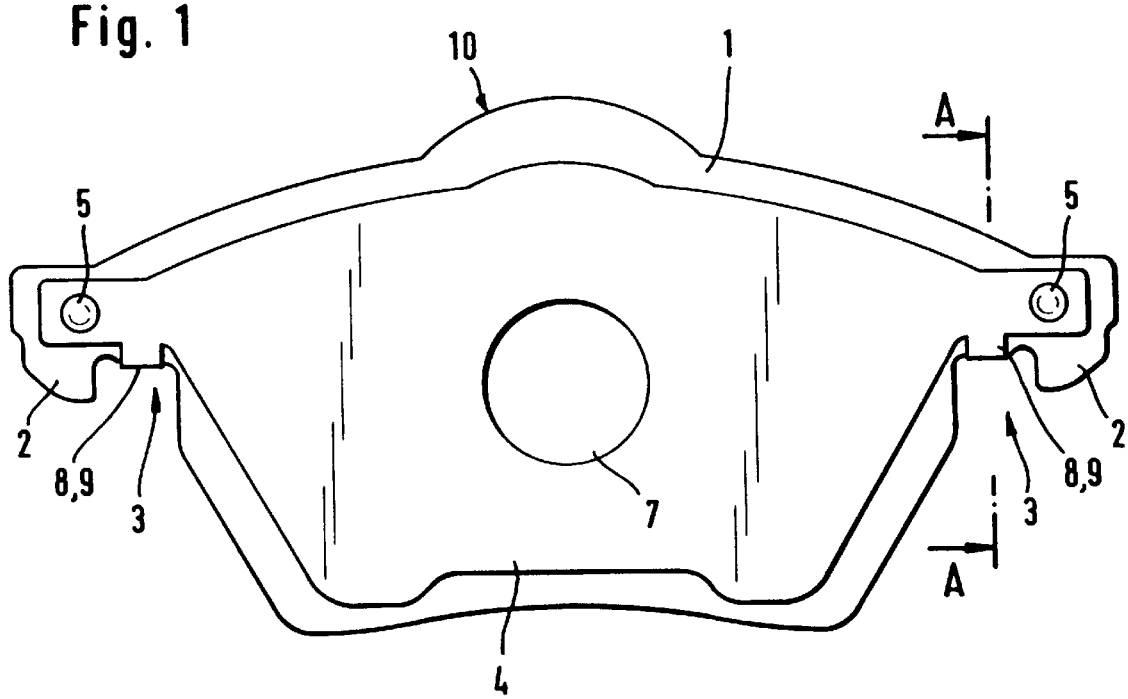
FIG. 1 is a view of the back side of a brake shoe of the present invention.

The FIG. 1 embodiment shows a lining carrier plate 1 for a floating-caliper brake. It can be seen that the lining carrier plate 1 has a hammer-shaped portion 2 on each of its opposite tangential sides. Portions 2 are intended for the axially slidable support of the brake shoe on two axial arms of the brake carrier. The bottom sides of the hammer-shaped portions 2 slidingly abut the arms of the brake carrier and thus form a contact point 3 between the lining carrier plate 1 and the brake carrier (which is not shown in the drawing). Attached to the back side of the lining carrier plate 1 is a damping plate 4 which is is able to damp noise-producing vibrations in an axial direction. The damping plate 4 is substantially conformed to the contour of the lining carrier plate 1 and fixed to the lining carrier plate 1 by way of two pins 5 which project in an axial direction from the lining carrier plate 1 in the area of the hammer shaped portions 2. The pins 5 extend through corresponding bores 6 (FIG. 3) in the damping plate 4 and are wobble-riveted on the back side of the damping plate 4.

An opening 7 can be seen roughly centrically in the damping plate 4. The purpose of opening 7 is to improve the noise damping in an axial direction, however, it is not important with respect to the present invention. Also, it can be seen from FIG. 1 that each tab-shaped portion 8 of the damping plate 4 is provided in the area of the contact points 3. Portion 8 is bent so that it is arranged on the radial contact points 3 between the lining carrier plate 1 and the arms of the brake carrier. The portions 8 form a noise-damping radial layer 9 which is appropriate to damp noise-producing vibrations of the brake shoe, which appear in a radial direction upon operation of the brake, in such a way that they are transmitted not at all, or only to an insignificant extent, to the brake carrier, and through the brake carrier as sound conducted through solids to the vehicle body. Thus, the radial layers 9 contribute greatly to damping the noises which occur during operation of the disc brake in the sense of the present invention.

It should be noted that for further improvement of the noise-damping effect another radial layer can be provided in the area of the contact point 10 between the lining carrier plate 1 and the brake housing (not shown). In this case, the damping plate 4 in its upper area could also have a tab-shaped portion which is bent so that it is arranged on the contact point 10 where it provides a radial noise-damping layer.

Figure 2:
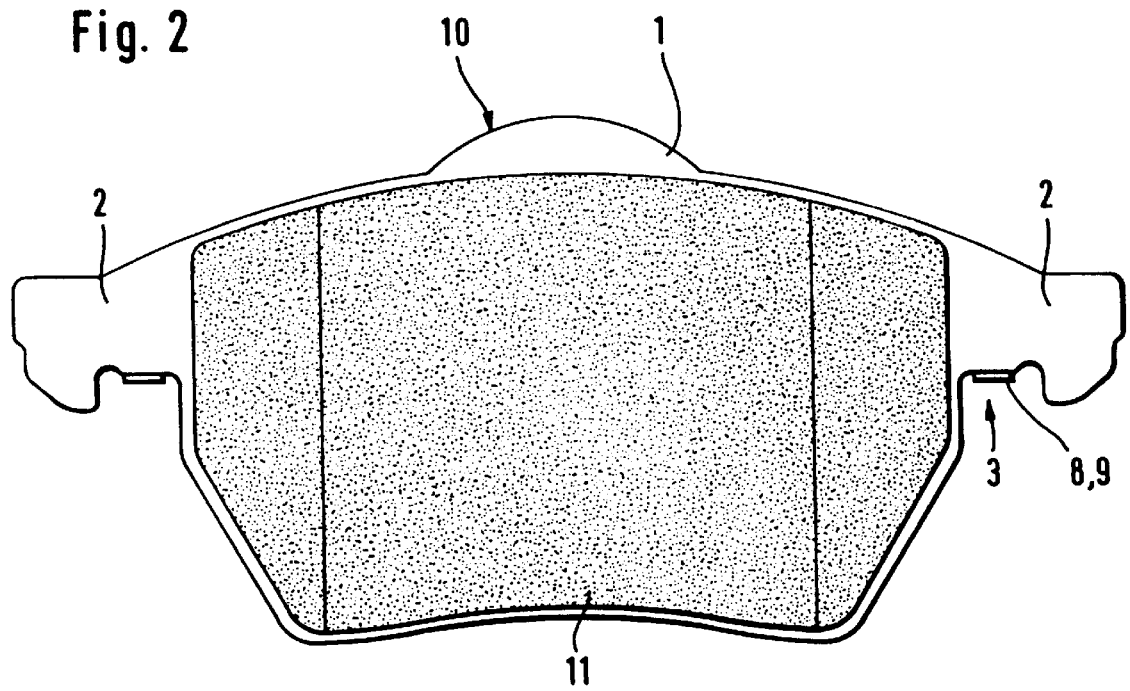
FIG. 2 is a view of the front side of a brake shoe of the present invention.

FIG. 2 also shows the brake lining 11 of the brake shoe. It can be seen that the deflected portion 8 of the damping plate 4 or the radial layer 9 extends in the area of the contact point 3 exclusively in the axial direction. Thus, this embodiment corresponds to a configuration of damping plate 4 which can be taken from FIGS. 3 and 4.

It can be seen in the damping plate 4 shown in the FIG. 3 embodiment that each of the portions 8 which provide the radial layer 9 is bent at right angles from the plane of the damping plate 4 so that they extend in an axial direction and bear against the contact points 3 on the bottom side of the lining carrier plate 1 (FIG. 4). Further, FIG. 3 shows the above-described opening 7 and two bores 6 which are used to attach the damping plate 4 to the back side 12 of the lining carrier plate 1. For assembly reasons, the left-hand bore 6 in FIG. 3 is configured as an elongated hole.

It can be seen in the FIG. 4 embodiment that the damping plate 4 bears against the back side 12 of the lining carrier plate 1 and is fixed by means of a wobble-riveted pin 5 which extends through the bore 6 in the damping plate 4. In addition, brake lining 11 is secured to the front side 13 of the lining carrier plate 1, as can be seen in FIG. 2. The brake lining 11 cannot be seen in FIG. 4 because of the direction of view.

Another embodiment can be seen in FIGS. 5 and 6. In turn, the damping plate 4 includes the portions 8 bent off in an axial direction which each provide a noise-damping radial layer 9. When the damping plate 4 is mounted on the lining carrier plate 1, the portions 8 or radial layers 9 again bear against the bottom side of the lining carrier Plate 1 in the area of the contact points 3 (FIG. 6). However, it can be seen that each of the portions 8 or radial layers 9 has an extension 14, which is generally deflected in the radial direction of the disc brake. Extensions 14 backgrip the front side 13 of the lining carrier plate 1. It can be seen in FIG. 6 that the extension 14 is inclined by a small angle away from the front side 13 of the damping plate 4. In conformity with the length of the portion 8 in an axial direction, this design facilitates the assembly, on the one hand. On the other hand, it is thereby achieved that the lining carrier Plate 1 in the area of the contact points 3 is substantially only with its edges 15 in contact with the portions 8 or the radial layers 9 with the extensions 14. The latter provision has favorable effects in terms of improving the noise-damping effect of the radial layers 9. No riveted pins 5 can be seen in FIG. 6. Therefore, it is pointed out that the damping plate 4 can be attached in a different fashion to the back side 12 of the lining carrier plate 1. In the present case, the damping plate 4 is cemented to the back side 12 of the lining carrier plate 1 by using an appropriate adhesive.

What is claimed is:

1. Brake shoe for a spot-type disc brake, comprising:
   a lining carrier plate having hammer-shaped portions for axially slidable support of the brake shoe on a brake carrier and a brake lining on a front side of said lining carrier plate intended for application to a brake disc, and
   a damping plate attached to a back side of said lining carrier plate wherein the damping plate is arranged so as to bear on a plurality of radial contact points provided on a bottom surface of said hammer-shaped portions of said lining carrier plate, wherein the damping plate includes a deflected portion that provides a noise-damping layer which is arranged proximate the radial contact points of the hammer portions of the lining carrier plate, wherein the deflected portion of the damping plate which provides the noise-damping layer includes an extension that is deflected in a radial direction and further includes a backgrip for backgripping the front side of the lining carrier plate.

2. Brake shoe as claimed in claim 1, wherein the extension is inclined away from the front side of the damping plate, and wherein the length of the deflected portion is conformed to a thickness of the lining carrier plate so that an edge of the lining carrier plate abuts against the noise damping layer.

3. Brake shoe for a spot-type disc brake, comprising:
   a lining carrier plate having hammer-shaped portions for axially slidable support of the brake shoe on a brake carrier and a brake lining on a front side of said lining carrier plate intended for application to a brake disc, and
   a damping plate attached to a back side of said lining carrier plate wherein the damping plate is arranged so as to bear on a plurality of radial contact points provided on a bottom surface of said hammer portions of said lining carrier plate, wherein the damping plate includes a deflected portion that provides a noise-damping layer which is arranged proximate the radial contact points of the lining carrier plate, wherein said damping plate is fixedly attached by pins which project axially from the back side of said lining carrier plate and extend through corresponding bores in the damping plate.

4. Brake shoe as claimed in claim 3, wherein said pins engage said lining carrier plate on said hammer portions.

* * * * *